US008156217B2

(12) United States Patent  
Ramamoorthy

(10) Patent No.: US 8,156,217 B2  
(45) Date of Patent: Apr. 10, 2012

(54) DYNAMICALLY BALANCING LOAD FOR SERVERS

(75) Inventor: Sundaresan Ramamoorthy, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2095 days.

(21) Appl. No.: 10/723,643

(22) Filed: Nov. 24, 2003

(65) Prior Publication Data

US 2005/0114480 A1 May 26, 2005

(51) Int. Cl.  
*G06F 15/173* (2006.01)  
*G06F 9/46* (2006.01)  
(52) U.S. Cl. .......................... 709/224; 718/105  
(58) Field of Classification Search .............. 709/220, 709/223–226; 718/105  
See application file for complete search history.

(56) References Cited

U.S. PATENT DOCUMENTS

| 6,523,036 | B1* | 2/2003 | Hickman et al. ........... 707/10 |
| 6,571,288 | B1 | 5/2003 | Sarukkai |
| 6,578,068 | B1 | 6/2003 | Bowman-Amuah |
| 6,601,084 | B1 | 7/2003 | Bhaskaran et al. |
| 7,089,281 | B1* | 8/2006 | Kazemi et al. ........... 709/203 |
| 2002/0178262 | A1* | 11/2002 | Bonnell et al. ........... 709/225 |
| 2004/0236860 | A1* | 11/2004 | Logston et al. ........... 709/230 |

* cited by examiner

*Primary Examiner* — Chirag R Patel

(57) ABSTRACT

Dynamically balancing load for servers. Servers that are able to respond to requests directed at the system are monitored for. After discovery of a server, a performance metric is obtained for the discovered server. The performance metric for the discovered server is stored in a table. When a request is received, the request is routed to a selected server in the system of servers based on the performance metric, wherein the system of servers comprises the discovered servers.

20 Claims, 5 Drawing Sheets

DYNAMICALLY BALANCING LOAD FOR SERVERS

TECHNICAL FIELD

Embodiments of the present invention relate to the field of computer networks. Specifically, embodiments of the present invention relate to dynamically balancing load for servers.

BACKGROUND ART

Each year, traffic over computer networks such as the Internet gets heavier. Typically, rather than having a single server handle all requests for similar information, multiple servers are used. For example, a web site may have many servers that are capable of servicing incoming requests. At essentially one point in time, there may be hundreds of users making requests to the web site. A front-end server distributes those requests among the servers as best as it can. However, conventionally, the distribution of requests is not always efficient.

The front-end server, which may be referred to as a load balancer, can use one of several common techniques to balance the load among the back-end servers. The simplest technique is round robin. A round robin system simply rotates the requests to the back-end servers with each back-end server getting one request per rotation. Another common load balancing technique is to assign the request to the back-end servers randomly. Over the long haul, each back-end server should receive an equal number of requests. Still another technique is to assign a number to each of "N" servers and forward the request to a server by determining a number between 1 and N for each request. The request is then forwarded to the back-end server whose number matches the request number. Unfortunately, each of these techniques suffers in that imbalances in load can occur for a variety of reasons.

A second problem with conventional load balancing is that one of the back-end servers can go down. The front-end server sometimes does not recognize this, which results in a request being forwarded to a server that is unable to handle the request. This typically results in an error message and a frustrated requestor. For example, the request may witness the all too common error message that information is not available. If the user tries to get the information again the problem may go away simply because by chance the request is forwarded to a functioning server this time. However, the user has wasted time and raised his/her frustration level. It is also possible that the error is only logged locally, and the user's browser sits waiting for a response that never arrives.

Thus, one problem with conventional load balancing is that the load becomes imbalanced between the servers. Another problem with some conventional load balancing techniques is that they fail to recognize when a server has gone down.

DISCLOSURE OF THE INVENTION

The present invention pertains to a method and system of dynamically balancing load for servers. In one embodiment of the present invention, certain acts are performed to dynamically discover servers and balance load to the servers. Included in those acts are monitoring for servers that are able to respond to requests directed at the system. After discovery of a server, a performance metric is obtained for the discovered server. The performance metric for the discovered server is stored in a table. When a request is received, the request is routed to a selected server in the system of servers based on the performance metric, wherein the system of servers comprises the discovered servers.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of embodiments of the present invention, a method and system of dynamically balancing load for servers, numerous specific details are set forth in order to provide a thorough understanding of the present invention. However, embodiments of the present invention may be practiced without these specific details or by using alternative elements or methods. In other instances well known methods, procedures, components, and circuits have not been described in detail as not to unnecessarily obscure aspects of the present invention.

Embodiments of the present invention provide a method and system of balancing load that dynamically discover when servers first become available and determine a performance metric for the servers at that time. Thus, methods and systems in accordance with the present invention are not limited to only routing requests to servers that a load-balancing agents was informed about by, for example, a system administrator. The performance metric for each discovered server may be stored in a table. A stress factor may also be calculated for each server, based on server load and the performance metric. Requests to the servers may be balanced based on the stress factor. Embodiments of the present invention provide a method and system of balancing load that avoids imbalances experienced by conventional load balancing techniques.

Figure 1:
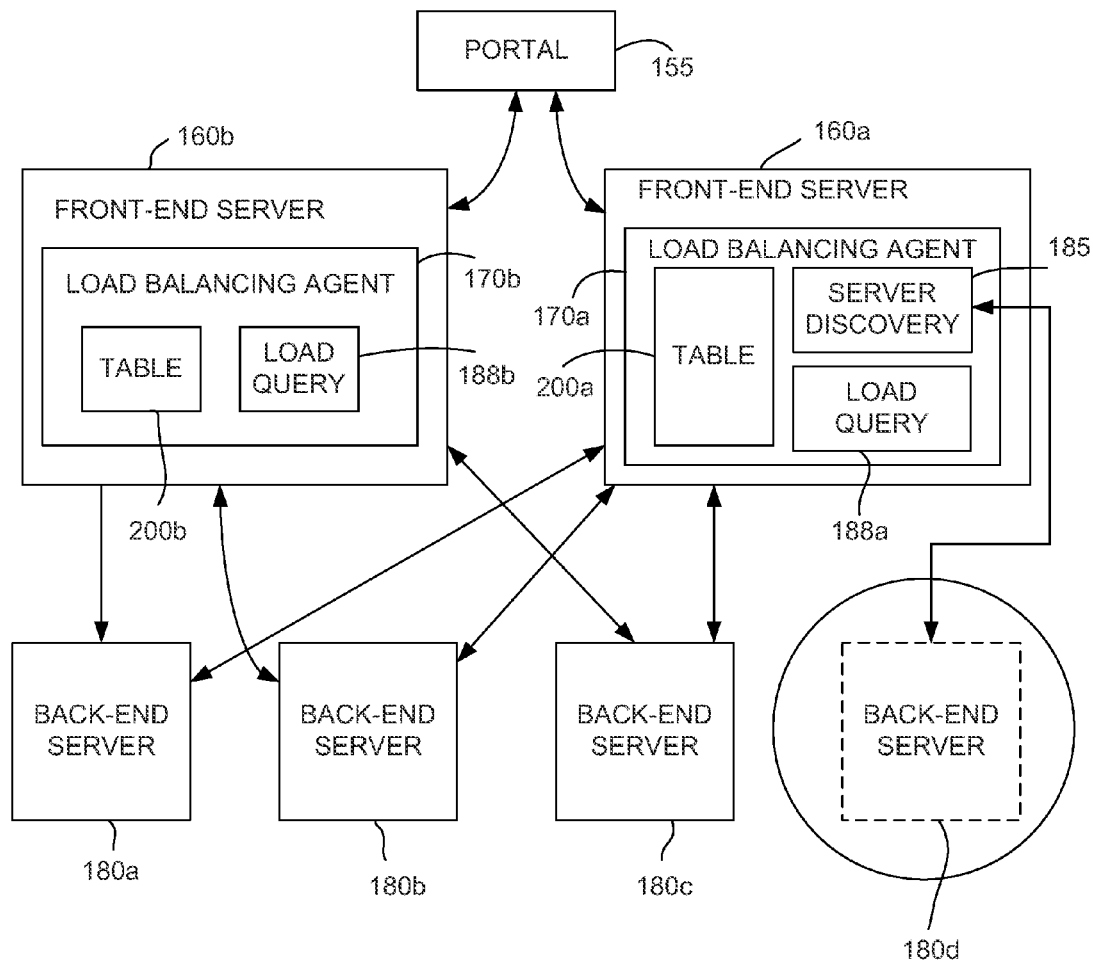
FIG. 1 illustrates a system that balances a load between servers, in accordance with an embodiment of the present invention.

FIG. 1 depicts a system 150 that dynamically discovers servers and dynamically balances a load between the servers, in accordance with an embodiment of the present invention. The system 150 comprises two front-end web servers 160a and 160b that each has a load-balancing agent 170a, 170b. The system 150 also comprises a number of back-end servers 180a, 180b, 180c that are able to service requests to the system 150. For example, the requests may be for information stored on a back-end web server 180a, 180b, 180c or a database that is accessible by a back-end web server 180a, 180b, 180c. The present invention is well suited to using any number of front-end web servers 160a, 160b and any number of back-end servers 180a, 180b, 180c. The system 150 comprises a portal 155 to allow access to the web site, for example. In this example, the system 150 is a web site, although the present invention is not limited to balancing load at a web site. For example, the load may be balanced between computing devices in a LAN (local area network), WAN (wide area network), etc.

In this embodiment, at least one of the load-balancing agents 170a dynamically discovers new servers 180n. It is not required that server discovery is performed by the load balancing agent 170a, 170b; another component may perform the server discover and inform the load balancing agents 170a, 170b. The dynamic server discovery logic 185 is used to discover new servers 180n that are capable of servicing requests to the system 150. In FIG. 1, one of the load-balancing agents 170a is depicted in the process of discovering a new server 180n. Upon discovery, load-balancing agent 170a may inform load-balancing agent 170b of the new server 180n. Alternatively, each load balancing agent 170a, 170b may perform server discovery independently. Advantageously, an administrator is not required to provide the load-balancing agent 170a, 170b with a configuration file identifying the new server.

In one embodiment, dynamic server discovery is performed using UDDI (Universal Description, Discovery, and Integration). In another embodiment, CORBA (Common Object Request Broker Architecture) is used to dynamically discover new servers. However, the present invention is not limited to using UDDI or CORBA for discovering new servers 180n. The new servers 180n that are discovered are not servers that were once a part of the system 150, but that went offline for some reason. Rather, they are servers that were not previously a part of the system 150. Thus, the new servers are servers of which the load-balancing agent 170a, 170b was previously unaware. However, the load-balancing agent 170a, 170b is capable of determining that a server that went offline has again become capable of handing requests.

An example of new servers coming online, for illustrative purposes, is a company bringing more servers online during a period in which the number of requests is expected to increase, such as holidays. Embodiments of the present invention dynamically discover the new servers without requiring an administrator to send a configuration file to the agent. This is in contrast to typical conventional systems that require a system administrator to make the agent aware of the new servers by sending a new configuration file. Moreover, in contrast to some conventional systems, the new servers do not need to be rebooted in embodiments of the present invention.

Each load-balancing agent 170a, 170b maintains a table 200a, 200b that is used in determining to which server 180a, 180b, 180c to route an incoming request. The table 200a, 200b may comprise a performance metric and a stress factor for each server 180a, 180b, 180c. The performance metric may be response time to a request that is determined at the time a new server 180n is discovered. Thus, the table 200a, 200b is modified each time a new server 180n is discovered. However, the present invention is not limited to modifying the table 200a, 200b only when a new server 180n is discovered. In one embodiment, the table 200a, 200b is modified periodically, based on an analysis performed by the load-balancing agent 170a, 170b. Moreover, the table 200a, 200b may include information for servers that the load-balancing agent was informed of by, for example, a system administrator. Thus, the table 200a, 200b is not limited to information about servers that the load-balancing agent discovered itself.

The table 200a, 200b may also contain load information for each server 180a, 180b, 180c. The load-balancing agent 170a, 170b is able to query the servers 180a, 180b, 180c for load information, in one embodiment of the present invention. The load-balancing agents 170a, 170b are depicted with load query logic 188a, 188b to perform this function. The load information may be used to determine a stress factor for each server 180a, 180b, 180c, as discussed below.

Figure 2:
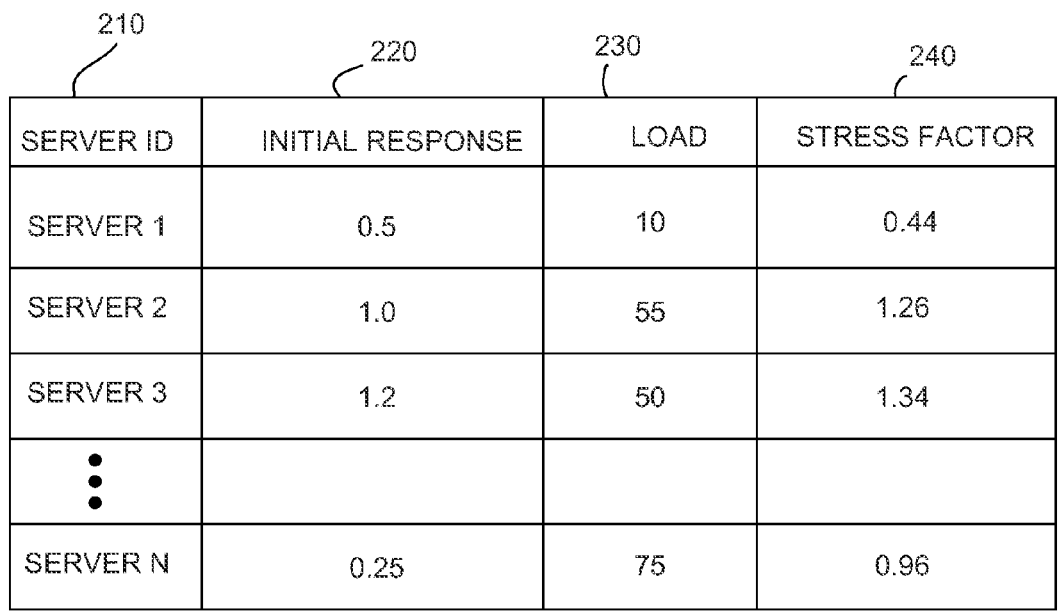
FIG. 2 is a flowchart illustrating a process of discovering and analyzing new servers, in accordance with an embodiment of the present invention.

FIG. 2 is an exemplary performance metric table 200, in accordance with an embodiment of the present invention. There is a server identifier column 210, an initial response time column 220, a load column 230, and a stress factor column 240. The stress factor may be calculated according to Equations 1-3 below. However, the present invention is not limited to calculating the stress factor via Equations 1-3. The initial response time describes the response when the server is first discovered. Hence, it is a measure of unloaded response time. The performance metrics in the table 200 of FIG. 2 are exemplary and many other metrics may be used within the scope of the present invention.

Figure 3:
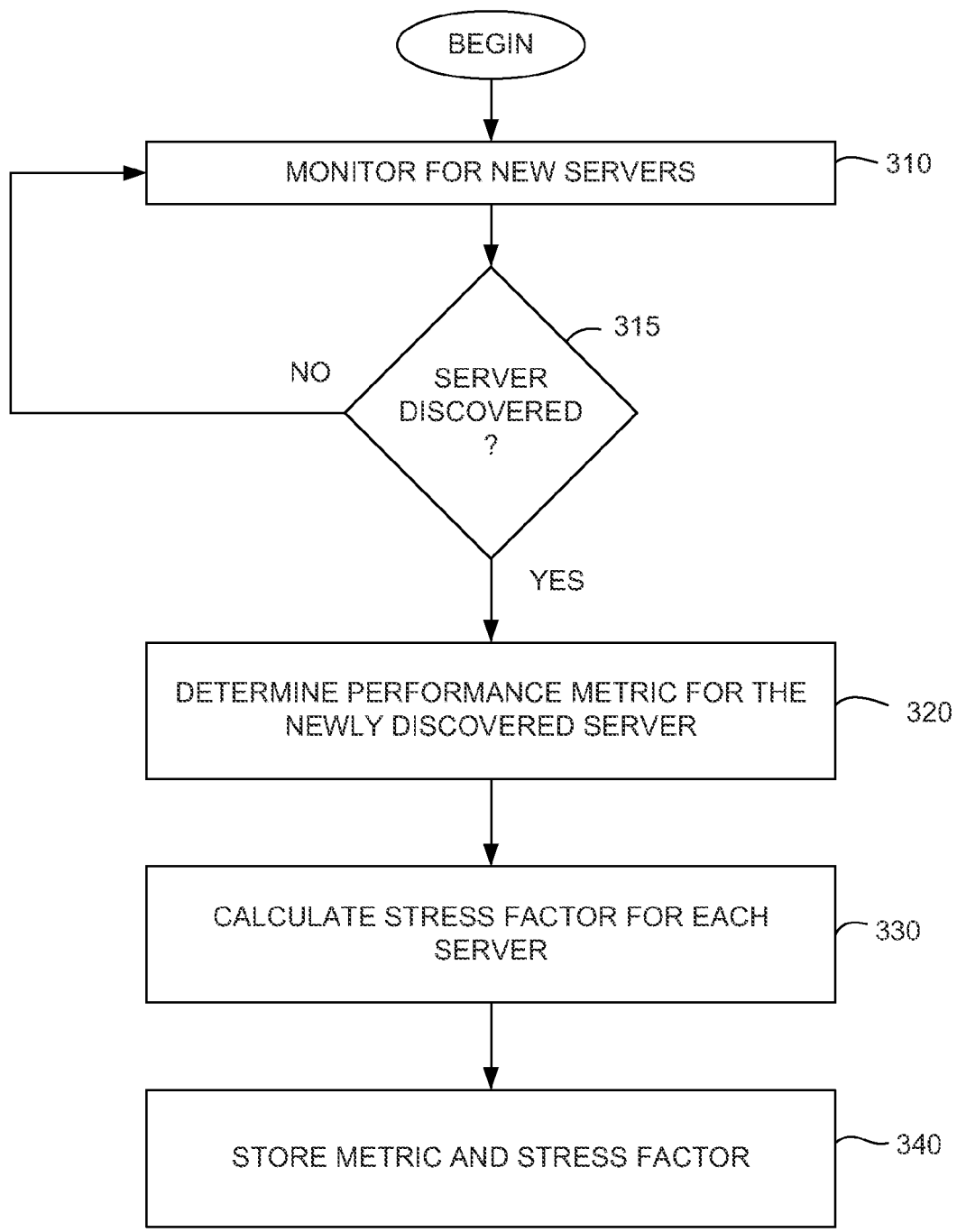
FIG. 3 is a flowchart illustrating a process of balancing a load between servers, in accordance with an embodiment of the present invention.

FIG. 3 illustrates steps in a process 300 of dynamic server discovery and performance evaluation, in accordance with an embodiment of the present invention. Steps of process 300 may be stored as instructions in a computer readable medium. The instructions may be executed by a general-purpose computer, such as computer system 100 of FIG. 5, in order to implement the process 300. Process 300 is an ongoing process that is active while the load-balancing agent is routing requests to the servers, although the routing is not depicted in process 300. In step 310, a load balancing agent monitors for new servers that were previously not part of the system. The monitoring may be performed at any suitable time and with any suitable periodicity. When a new server is discovered, steps 320, 330, and 340 are performed in which information about the new server is collected and stored. Then, the load-balancing agent again monitors for new servers.

More specifically, process 300 goes to step 320 if step 315 indicates a new server is discovered. In step 320, the load-balancing agent determines a performance metric for the server as that server is discovered. The performance metric is a response time to a request, in one embodiment. For example, while the new system is not yet processing requests, the load-balancing agent may send a "Hello" to the newly discovered server. In one embodiment, the load-balancing agent sends a database query to the new server.

At step 330 the present embodiment makes a determination of a stress factor that may be used in a request routing decision. The determination may be made in a number of ways; the exact formula is not critical. To determine the stress factor, first the load-balancing agent may first determine the average load for the servers in the system. The load-balancing agent performs a query of load information from each server and calculates average load according to Equation 1.

$$\text{Ave\_Load} = (\text{Serv1\_Load} + \text{Serv2\_Load} + \ldots \text{ServN\_Load})/N \quad \text{Equation 1}$$

It is not required that the load query be performed with each request. For example, the load query may be performed periodically by the load-balancing agent at any convenient interval. The load for each server is stored in the performance metric table.

The load-balancing agent of the present embodiment then may determine the average response for servers in the system according to the formula in Equation 2. In Equation 2, Init_Resp_ServN refers to the initial response of a given server that was determined by the load-balancing agent when that server was first discovered.

$$\text{Ave\_Resp} = (\text{Init\_Resp\_Serv1} + \text{Init\_Resp\_Serv2} + \ldots \text{Init\_Resp\_ServN})/N \quad \text{Equation 2}$$

From Equations 1 and 2, the load balancing agent may determine the stress factor for a given server in accordance with Equation 3, where ServN_Load and Init_Resp_ServN are obtainable from the performance metric table, Ave_Load is calculated as per Equation 1, and Ave_Resp is calculated per Equation 2.

$$\text{Stress}\_N = ((\text{Serv}N\_\text{Load}/\text{Ave}\_\text{Load}) + (\text{Init}\_\text{Resp}\_\text{Serv}N/\text{Ave}\_\text{Resp})) * 0.5 \quad \text{Equation 3}$$

The load-balancing agent may calculate a stress factor for each server in the system and route the request to the server with the lowest stress factor. It is possible that two or more servers have a stress factor that is either the same or so close to one another that for the present discussion the stress factor may be considered essentially the same. In either of these cases, the load balancing agent may decide between the servers by dynamically running the response query to re-order the servers. Thus, the initial response (e.g., Init_Resp_ServN) is replaced by a current response.

At step 340 the present embodiment stores the performance metric and the stress factor in a table. The table may be used in the process 400 of FIG. 4 to make a request routing decision. The process 300 then returns to step 310 of monitoring for new servers.

Figure 4:
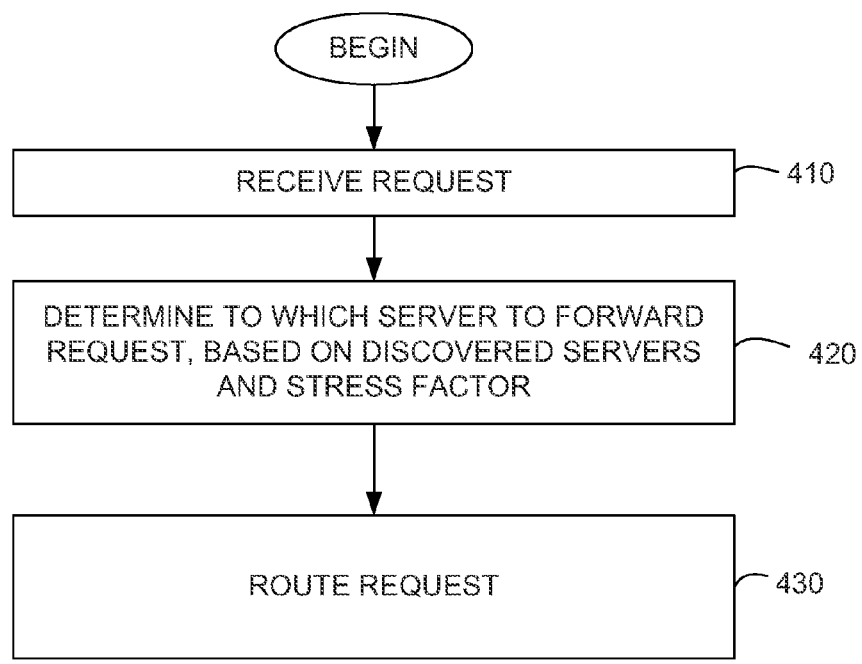
FIG. 4 is an exemplary table of performance metrics, in accordance with an embodiment of the present invention.

FIG. 4 illustrates steps in a process 400 of dynamic load balancing, in accordance with an embodiment of the present invention. Steps of process 400 may be stored as instructions in a computer readable medium. The instructions may be executed by a general-purpose computer, such as computer system 100 of FIG. 5, in order to implement the process 400. Process 300 of FIG. 3 and process 400 of FIG. 4 may execute concurrently.

At step 410, the present embodiment accesses a request that is serviceable by at least one of the servers. For example, a request may be received by a front-end web server.

Next, at step 420 the present embodiment routes the request to a server as determined by accessing the stress factor for the discovered servers. For example, the load-balancing agent accesses a table to find the server currently having the lowest stress factor. The servers from which the load-balancing agent selects from are not limited to those servers that the agent actively discovered itself.

In step 430, the present embodiment routes the request to the server that was determined to have the lowest stress factor. The process 400 repeats itself as new requests are received in step 410. As process 300 of FIG. 3 may be executing concurrently with process 400, the number of servers that are available changes as servers are dynamically discovered. Moreover, the load-balancing agent does not passively wait to be informed about new servers, but actively seeks out new servers. Furthermore, the values in the table may also change dynamically as the load balancing agent performs new load queries and discovers more servers.

Figure 5:
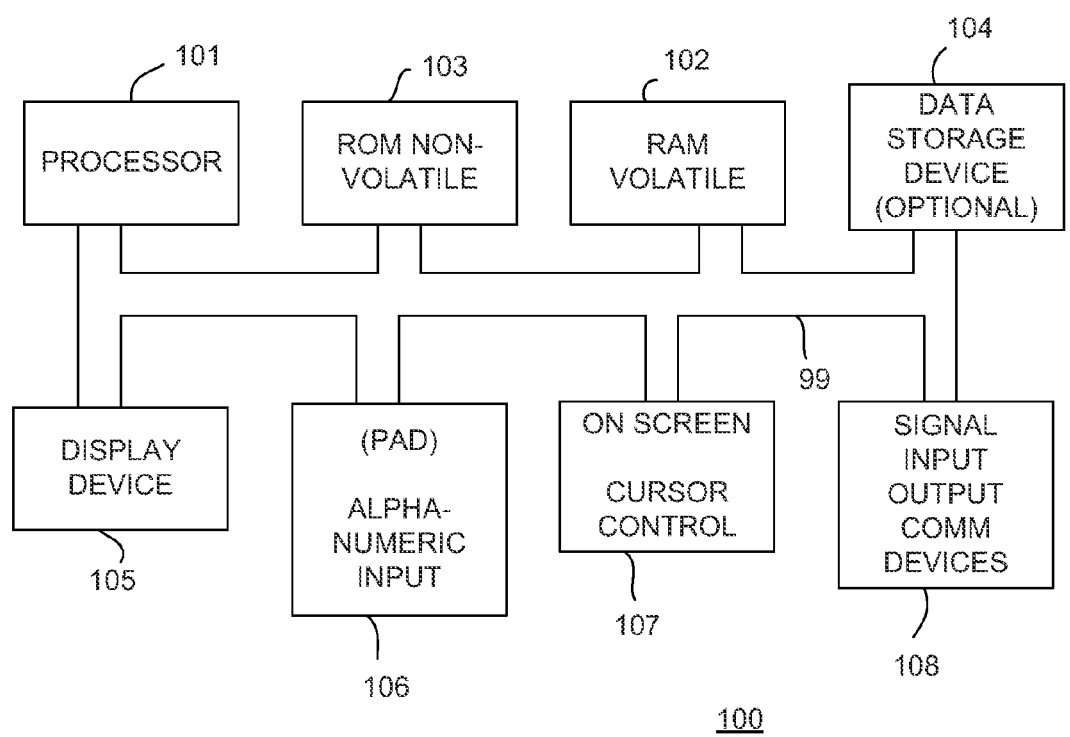
FIG. 5 is an exemplary computer platform, upon which embodiments of the present invention may be practiced.

FIG. 5 illustrates circuitry of an exemplary computer system 100, which may form a platform for embodiments of the present invention. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 5, computer system also includes an alphanumeric input device 106 including alphanumeric and function keys coupled to bus 99 for communicating information and command selections to central processor unit 101. Computer system also includes a cursor control device 107 coupled to bus 99 for communicating user input information and command selections to central processor unit 101. Computer system of the present embodiment also includes a display device 105 coupled to bus 99 for displaying information. A signal input/output communication device 108 coupled to bus 99 provides communication with external devices.

While the present invention has been described in particular embodiments, it should be appreciated that the present invention should not be construed as limited by such embodiments, but rather construed according to the below claims.

What is claimed is:

1. A method of dynamically balancing load in a system of servers, comprising:
    a) monitoring for servers that are able to respond to requests directed at the system, including actively discovering new servers in said system of servers;
    b) determining a performance metric for a first set of said servers discovered by said monitoring for the servers;
    c) maintaining a table comprising said performance metric for said first set of discovered servers; and
    d) in response to receiving a request, routing said request to a selected server in the system of servers based on said performance metric, wherein the system of servers comprises the first set of discovered servers.

2. The method of claim 1, further comprising:
    determining a load on ones of the servers in the system of servers.

3. The method of claim 2, further comprising:
    determining a stress factor for a given server based on the performance metric of the given server and the load on the given server.

4. The method of claim 1, further comprising:
    determining a stress factor for ones of the servers in the system of servers based on the performance metrics.

5. The method of claim 1, wherein the performance metric is a response time.

6. The method of claim 1, wherein the performance metric is a response time when the servers discovered by said monitoring are unloaded.

7. The method of claim 1, further comprising:
    periodically reevaluating said performance metric for the servers in the system of servers.

8. A method of dynamically balancing load, comprising:
    a) dynamically discovering a first set of servers that are able to respond to requests directed at a system and actively discovering new servers of said system;
    b) determining a response time of each of the first set of discovered servers;
    c) calculating stress factors for each of the first set of discovered servers, based in part on said response time;
    d) receiving a request to the system;
    e) determining a server in the system to route the request to based on the stress factors, wherein the system comprises the first set of discovered servers; and
    f) routing said request to said server in the system determined in said e).

9. The method of claim 8, wherein said b) comprises determining a response time for each of the first set of discovered servers to a request.

10. The method of claim 8, wherein said b) comprises determining a response time for each of the first set of discovered servers to a database query.

11. The method of claim 8, wherein said c) comprises calculating the stress factor for each of the first set of discovered servers, based on said response time and a load for each of the first set of discovered servers.

12. The method of claim 8, wherein:
said b) further comprises determining a response time of a second set of discovered servers not discovered in said a);
said c) comprises calculating stress factors for each of the second set of discovered servers not discovered in said a), wherein the system further comprises the second set of discovered servers not discovered in said a).

13. The method of claim 12, wherein said second set of discovered servers not discovered in said a) are reported to a load-balancing agent in a configuration file.

14. A system for balancing load, comprising:
a plurality of back-end servers that are able to service requests to the system;
a front-end server having a load balancing agent comprising a table, wherein said front-end server receives requests that are forwarded to said back-end servers, and wherein said load balancing agent is operable to:
monitor for back-end servers that are able to service requests to the system, including actively discovering new back-end servers;
determine a performance metric for the back-end servers discovered by the monitoring; and
determine a server of said back-end servers to route a request to based on the performance metric.

15. The system of claim 14, wherein said load balancing agent is further operable to determine a load on a given back-end server.

16. The system of claim 14, wherein said load balancing agent is further operable to determine a stress factor for ones of the back-end servers.

17. The system of claim 16, wherein the stress factor for a given one of the back-end servers is based on the performance metric and the load on a given of the given one of the back-end servers.

18. The system of claim 17, wherein said load balancing agent is able to determine which server of said back-end servers to route a request to based on the stress factor.

19. The system of claim 14, wherein the performance metric is a response time.

20. The system of claim 17, wherein said load balancing agent is able to include back-end servers that the load balancing agent did not discover in the determination of which server to route the request to.

* * * * *